United States Patent
Ptak et al.

(10) Patent No.: US 10,649,615 B2
(45) Date of Patent: May 12, 2020

(54) CONTROL INTERFACE FOR A THREE-DIMENSIONAL GRAPHICAL OBJECT

(71) Applicant: MICROSOFT TECHNOLOGY LICENSING, LLC, Redmond, WA (US)

(72) Inventors: Barry John Ptak, London (GB); David Mondelore, London (GB); Alexander Charles Cullum, Maidenhead (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 427 days.

(21) Appl. No.: 15/428,373

(22) Filed: Feb. 9, 2017

(65) Prior Publication Data

US 2018/0113595 A1 Apr. 26, 2018

Related U.S. Application Data

(60) Provisional application No. 62/410,694, filed on Oct. 20, 2016.

(51) Int. Cl.
*G06F 3/0481* (2013.01)
*G06T 19/20* (2011.01)
*G06F 3/0484* (2013.01)

(52) U.S. Cl.
CPC ...... *G06F 3/04815* (2013.01); *G06F 3/04842* (2013.01); *G06F 3/04845* (2013.01); *G06T 19/20* (2013.01); *G06T 2200/24* (2013.01); *G06T 2219/2016* (2013.01)

(58) Field of Classification Search
CPC ............. G06F 3/04845; G06F 3/04815; G06F 3/0481; G06F 3/0484
See application file for complete search history.

(56) References Cited

U.S. PATENT DOCUMENTS

| | | |
|---|---|---|
| 7,656,418 B2 | 2/2010 | Watkins et al. |
| 9,324,188 B1 | 4/2016 | Fram et al. |
| 2010/0177120 A1 | 7/2010 | Balfour |
| 2010/0245352 A1* | 9/2010 | Chakraborty ........... G06T 19/20 345/421 |
| 2012/0054689 A1 | 3/2012 | Friedman |
| 2012/0229450 A1 | 9/2012 | Kim et al. |
| 2013/0227493 A1 | 8/2013 | Schmidt |

(Continued)

OTHER PUBLICATIONS

Wu, et al., "TouchSketch: a touch-based interface for 3D object manipulation and editing", In Proceedings of 21st ACM Symposium on Virtual Reality Software and Technology, Nov. 2015, 11 pages.

*Primary Examiner* — Andrea C Leggett
(74) *Attorney, Agent, or Firm* — Shook, Hardy & Bacon LLP (57) ABSTRACT

Aspects of the technology described herein provide a control interface for manipulating a 3-D graphical object within a virtual drawing space. The control can be activated by selecting a graphical object or objects. When multiple objects are selected, the manipulations can occur as a group. In one aspect, the manipulations occur around the centroid of the 3-D graphical object, or groups of objects. The manipulations can include rotation, size adjustment, and positional adjustment within the virtual drawing space. The control interface comprises controls that rotate the object around an x-axis, an y-axis, or an z-axis.

20 Claims, 6 Drawing Sheets

(56) References Cited

U.S. PATENT DOCUMENTS

| | | |
|---|---|---|
| 2014/0015831 A1 | 1/2014 | Kim et al. |
| 2014/0019917 A1 | 1/2014 | Piemonte et al. |
| 2014/0146039 A1* | 5/2014 | Duplessis ............... G06T 19/20 345/419 |
| 2014/0229871 A1 | 8/2014 | Tai et al. |

* cited by examiner

CONTROL INTERFACE FOR A THREE-DIMENSIONAL GRAPHICAL OBJECT

CROSS-REFERENCE TO RELATED APPLICATIONS

This application claims the benefit of U.S. Provisional Application No. 62/410,694, filed Oct. 20, 2016, entitled "CONTROL INTERFACE FOR A THREE-DIMENSIONAL GRAPHICAL OBJECT," the entirety of which is herein incorporated by reference.

BACKGROUND

Traditionally, computer aided design applications have required users to know and use multiple control interfaces for manipulating three-dimensional graphical objects. Existing controls can also take up significant screen space and occlude the object being manipulated.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide a control interface for manipulating a 3-D graphical object within a virtual drawing space. The control can be activated by selecting a graphical object or group of objects. When multiple objects are selected, the manipulations can occur as a group. In one aspect, the manipulations occur around the centroid of the 3-D graphical object, or groups of objects. The manipulations can include rotation, size adjustment, and positional adjustment within the virtual drawing space.

In one aspect, the control comprises a visible bounding box that surrounds the selected object or objects. The bounding box comprise bars that can resize the object uniformly or non-uniformly in the X, Y, or Z dimension. The control interface also comprises controls that rotate the object around an x-axis, an y-axis, or an z-axis.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide a control interface for manipulating a 3-D graphical object within a virtual drawing space. The control can be activated by selecting a graphical object or objects. When multiple objects are selected, the manipulations can occur as a group. In one aspect, the manipulations occur around the centroid of the 3-D graphical object, or groups of objects. The manipulations can include rotation, size adjustment, and positional adjustment within the virtual drawing space.

In one aspect, the control comprises a visible bounding box that surrounds the selected object or objects. The bounding box comprise bars that can resize the object uniformly or non-uniformly in the X, Y, or Z dimension. The control interface also comprises controls that rotate the object around an x-axis, an y-axis, or an z-axis. The rotation can be about an object-centric axis, world axis, or some other axis. As used herein, an object-centric axis intersects the centroid of the object, but is otherwise directionally aligned with the corresponding x, y, or z world-centric axes. The object-centric axes are independent of the x, y, and z world axes within the virtual drawing space.

Figure 1:
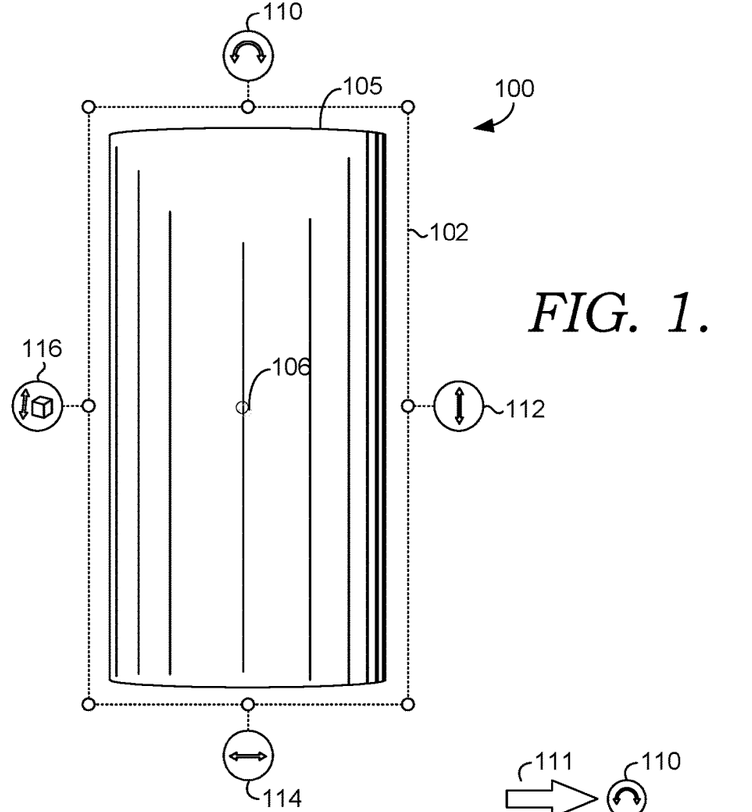
FIG. 1, shows a view of the control interface just after selection of an object, in accordance with aspects of the present disclosure.

Turning now to FIG. 1, a view of the control interface 100 is shown around a three-dimensional cylinder 105. The control interface includes a bounding box 102. The control interface 100 also includes a z-axis manipulator control 110, an x-axis manipulator control 112, a z-axis manipulator control 114, and a depth manipulator control 116. A user can rotate the cylinder 105 about the z-axis using the z-axis manipulator control 110. In an aspect, selecting a right side of the z-axis manipulator control 110 will rotate the top of the cylinder 105 to the right from the viewer's perspective. In an aspect, selecting the left side of the z-axis manipulator control 110 will rotate the top of the cylinder 105 to the left. Alternatively, the z-axis manipulator control 110 can rotate the object around the z-axis in only one direction. The z-axis manipulator control 110 can be depicted as an arrow.

The x-axis manipulator control 112 can be used to rotate the cylinder 105 about the x-axis. In an aspect, selecting one portion of the x-axis manipulator control 112 will rotate the top of the cylinder 105 towards the viewer. In an aspect, selecting the opposite side of the x-axis manipulator control 112 will rotate the top of the cylinder 105 away from the viewer. Alternatively, the x-axis manipulator control 112 can rotate the object around the x-axis in only one direction.

The y-axis manipulator control 114 can be used to rotate the cylinder 105 about the y-axis. In an aspect, selecting one portion of the y-axis manipulator control 114 will rotate the cylinder 105 a first direction. In an aspect, selecting the opposite side of the y-axis manipulator control 114 will rotate the cylinder 105 in the opposite direction. Alternatively, the y-axis manipulator control 114 can rotate the object around the y-axis in only one direction.

The depth controller 116 can change an object's positional depth within the virtual drawing space. The depth of an object corresponds to the z-value of the object's centroid 106. Increasing the z value of the centroid can be described as moving the object forward towards the viewer. Decreasing the z-value of the centroid 106 can be described as moving the object backwards away from the viewer.

In one aspect, upon selecting the depth controller 116, the camera view changes to look down on the cylinder. A track or line oriented in parallel to the z-axis can appear below the controller 116 and the user can change the depth of the cylinder 105 by sliding the control towards the viewer or away from the viewer along the track. In one aspect, an x-y coordinate plane that intersects the centroid 106 of the cylinder 105 is displayed upon activation of the controller 116. The plane can move as the cylinder 105 moves to help the user compare the depth of the cylinder 105 to the depth of other objects in the virtual drawing space.

Figure 2A:
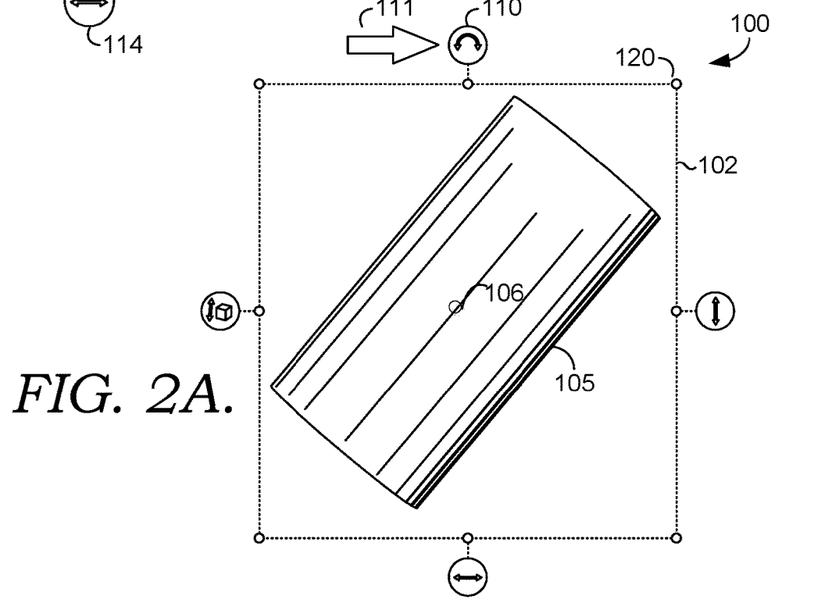
FIG. 2A, shows a view of the control interface just after the z-axis rotation control was used to rotate the object in a clockwise direction, in accordance with aspects of the present disclosure.

Turning now to FIG. 2A, a view of the control interface just after the z-axis rotation control 110 was used to rotate the object in a clockwise direction is shown, in accordance with aspects of the present disclosure. The z-axis is not depicted, but if visible would extend through the centroid 106 of the cylinder 105 towards the viewer and away from the viewer. In this case, the rotation along the z-axis is in a clockwise direction from the perspective of the viewer. Different amounts of rotation can be achieved by different types of input. For example, a single tap could cause a five or 10° rotation. Pressing and holding a selection of the control 110 can cause rotation to continue until the control is released. In one aspect, selecting the left side of control 110 causes a counterclockwise rotation and the selection of the right side of the control 110 causes a clockwise rotation.

In one aspect, the z-axis manipulator control 110 is a slider control. As the user selects and drags the control 110 towards uniform scale tool 120 (as shown by arrow 111) cylinder 105 can rotate in a clockwise direction. In one aspect, the cylinder 105 will have rotated 180°, 360° or some other amount by the time the control is dragged all the way to the scale tool 120. Dragging the z-axis manipulator control 110 to the left can cause the cylinder 105 to be rotated in a counterclockwise direction. The rotation stops when the user releases the control 110. The x-axis control 112 and the y-axis control 114 can be slider controls and work in similar fashion.

Figure 2B:
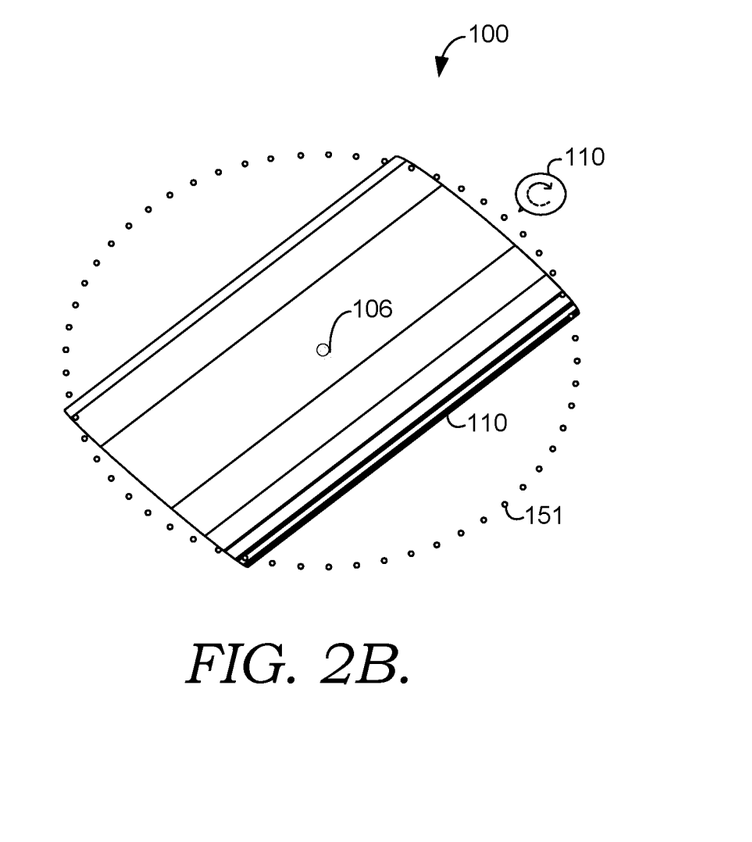
FIG. 2B, shows a view of the control interface just after the z-axis rotation control was used to rotate the object in a clockwise direction, in accordance with aspects of the present disclosure.

Turning now to FIG. 2B, a view of an alternate control interface just after the z-axis rotation control 110 was used to rotate the object in a clockwise direction is shown, in accordance with aspects of the present disclosure. The z-axis is not depicted, but if visible would extend through the centroid 106 of the cylinder 105 towards the viewer and away from the viewer. In this case, the rotation along the z-axis is in a clockwise direction from the perspective of the viewer. Upon selection of the z-axis control 110, a circle 151 appears around the cylinder 105. Rotating the control 110 can cause the object being controlled to rotate the same amount. Accordingly, if the control 110 is rotated 57 degrees around the circle 151 then the cylinder 105 would rotate 57 degrees.

Figure 3:
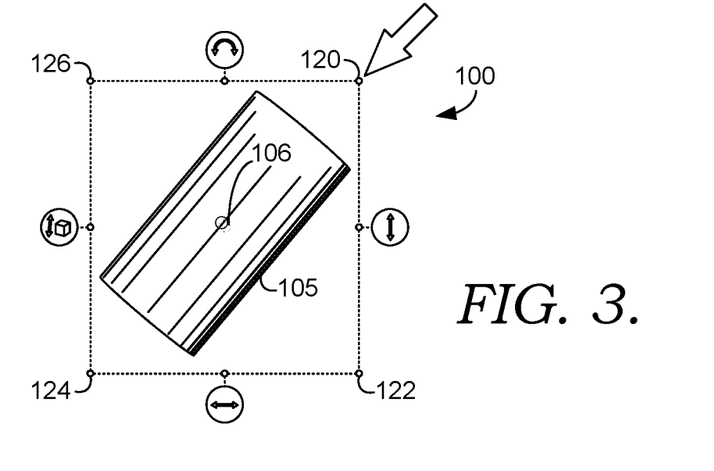
FIG. 3, shows a view of the control interface just after the uniform scale tool has been used to uniformly reduce the size of the object, in accordance with aspects of the present disclosure.

Turning now to FIG. 3, a view of the control interface just after the uniform scale tool has been used to uniformly reduce the size of the object is shown, in accordance with aspects of the present disclosure. In an aspect, uniform scale controls (120, 122, 124, and 126) are located at each corner of the bounding box 102. Selecting and dragging any of the uniform scale controls (120, 122, 124, and 126) away from the cylinder 105 will uniformly increase the size of the cylinder in each dimension. Conversely, selecting and dragging any of the uniform scale controls (120, 122, 124, and 126) towards the cylinder 105 will uniformly decrease the size of the cylinder.

Figure 4:
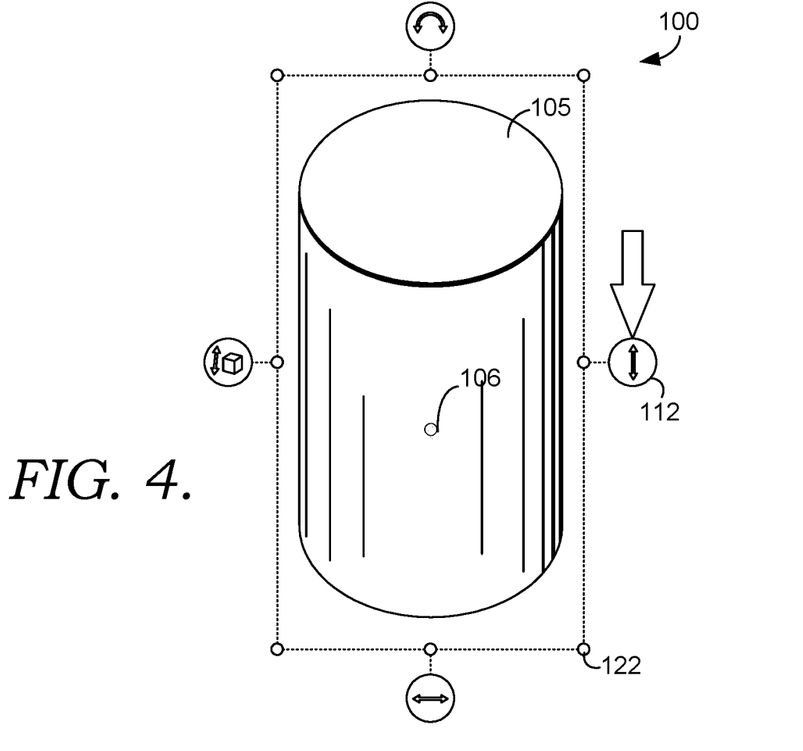
FIG. 4, shows a view of the control interface just after the x-axis rotation control was used to rotate the object, in accordance with aspects of the present disclosure.

Turning now to FIG. 4, a view of the control interface just after the x-axis rotation control was used to rotate the object is shown, in accordance with aspects of the present disclosure. The x-axis is not depicted, but if visible, the x-axis would extend through the centroid 106 of the cylinder 105 horizontally across the drawing space. In this case, the rotation along the x-axis is towards the viewer. Different amounts of rotation can be achieved by different types of input. For example, a single tap could cause a five or 10° rotation. Pressing and holding a selection of the control 112 can cause rotation to continue until the control is released. In one aspect, selecting the upward facing portion of control 112 causes a rotation of the top of the object away from the viewer and selection of the downward arrow part of the control 112 causes the top of the cylinder 105 to rotate towards the viewer.

In one aspect, the x-axis manipulator control 112 is a slider control. As the user selects and drags the control 112 downward towards uniform scale tool 122 cylinder 105 can rotate in a first direction. In one aspect, the cylinder 105 will have rotated 180°, 360° or some other amount by the time the control 112 is dragged all the way to the scale tool 122. Dragging the x-axis manipulator control 112 upward can cause the cylinder 105 to be rotated in a second direction. The rotation stops when the user releases the control 112.

Figure 5:
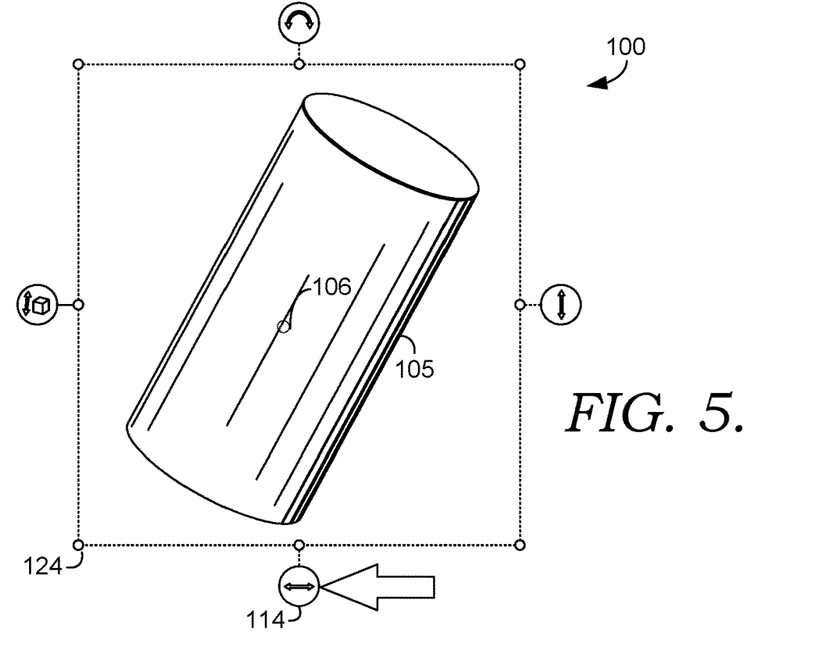
FIG. 5, shows a view of the control interface just after the y-axis rotation control was used to rotate the object, in accordance with aspects of the present disclosure.

Turning now to FIG. 5, a view of the control interface just after the y-axis rotation control was used to rotate the object is shown, in accordance with aspects of the present disclosure. The y-axis is not depicted, but if visible would extend through the centroid 106 of the cylinder 105 vertically up and down the drawing space. Different amounts of rotation can be achieved by different types of input. For example, a single tap could cause a five or 10° rotation. Pressing and holding a selection of the control 114 can cause rotation to continue until the control is released. In one aspect, selecting the right facing portion of control 114 causes a rotation in a first direction and selection of the left arrow part of the control 114 causes the cylinder 105 to rotate along the y-axis in a second direction.

In one aspect, the y-axis manipulator control 114 is a slider control. As the user selects and drags the control 114 left towards uniform scale tool 124 cylinder 105 can rotate in a first direction. In one aspect, the cylinder 105 will have rotated 180°, 360° or some other amount by the time the control 114 is dragged all the way to the scale tool 124.

Dragging the y-axis manipulator control 114 to the right can cause the cylinder 105 to be rotated in a second direction. The rotation stops when the user releases the control 114.

Figure 6:
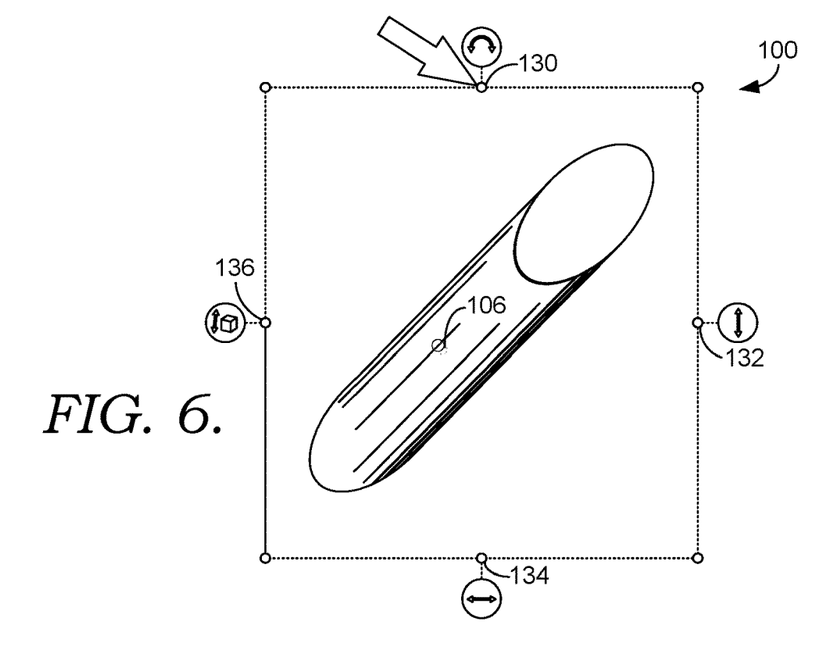
FIG. 6, shows a view of the control interface just after the non-uniform scale tool has been used to non-uniformly reduce the size of the object, in accordance with aspects of the present disclosure.

Turning now to FIG. 6, a view of the control interface just after the non-uniform scale tool has been used to non-uniformly reduce the size of the object is shown, in accordance with aspects of the present disclosure. In an aspect, non-uniform scale controls (130, 132, 134, and 136) are located at the midpoint of each side of the bounding box 102. Selecting and dragging any of the non-uniform scale controls (130, 132, 134, and 136) away from the cylinder 105 will increase the size of the cylinder 105 only in the direction pulled. In one axis, the object is expanded along the axis that most closely matches the direction the user pulls the non-uniform scale tool. The expansion can be along an object-centric axis. Conversely, selecting and dragging any of the non-uniform scale controls (130, 132, 134, and 136) towards the cylinder 105 will decrease the size of the cylinder 105 only in the dimension in which the control is pulled.

Figure 7:
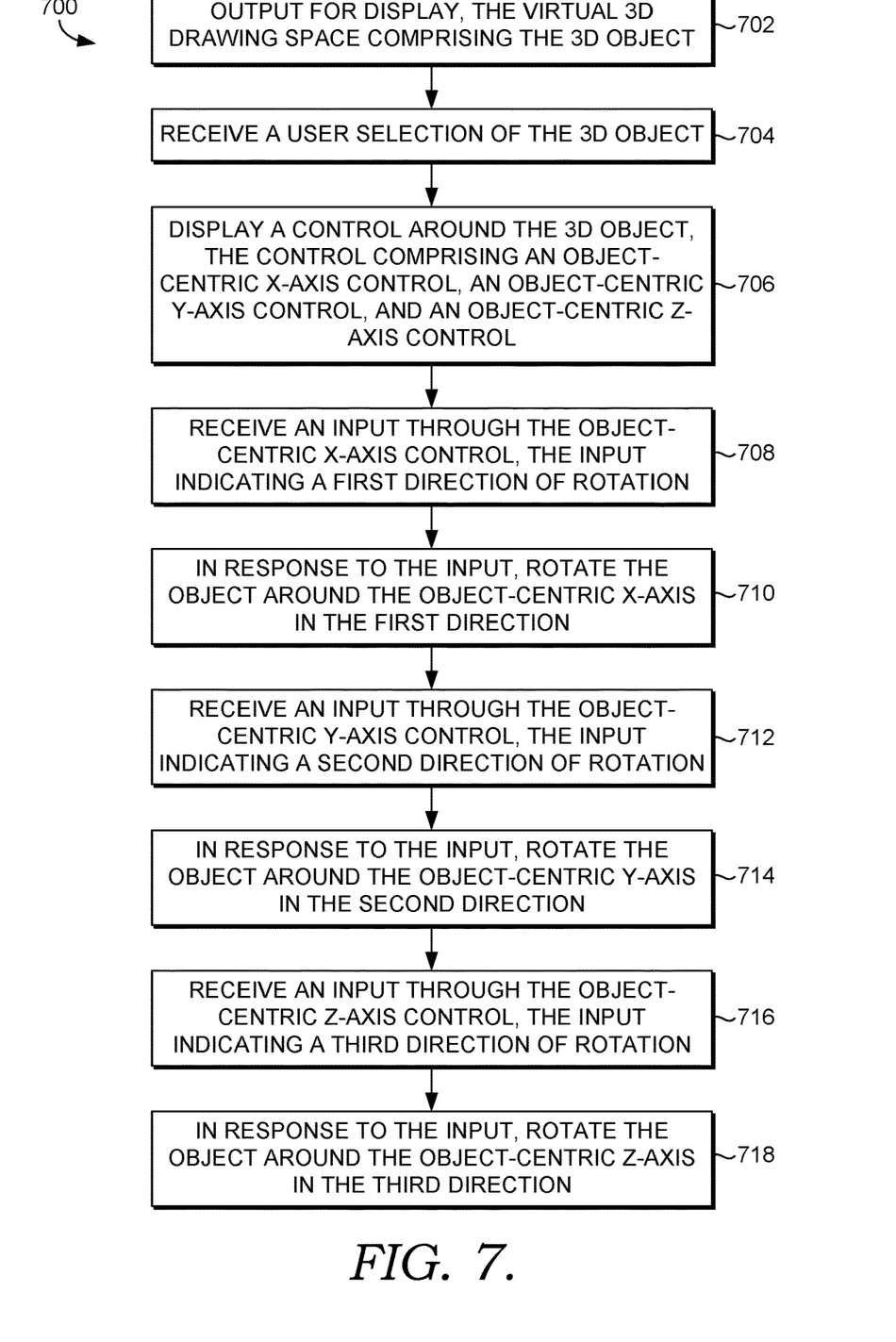
FIG. 7 depicts a flow diagram of a method for manipulation a 3D graphical object, in accordance with aspects of the present disclosure.
Figure 8:
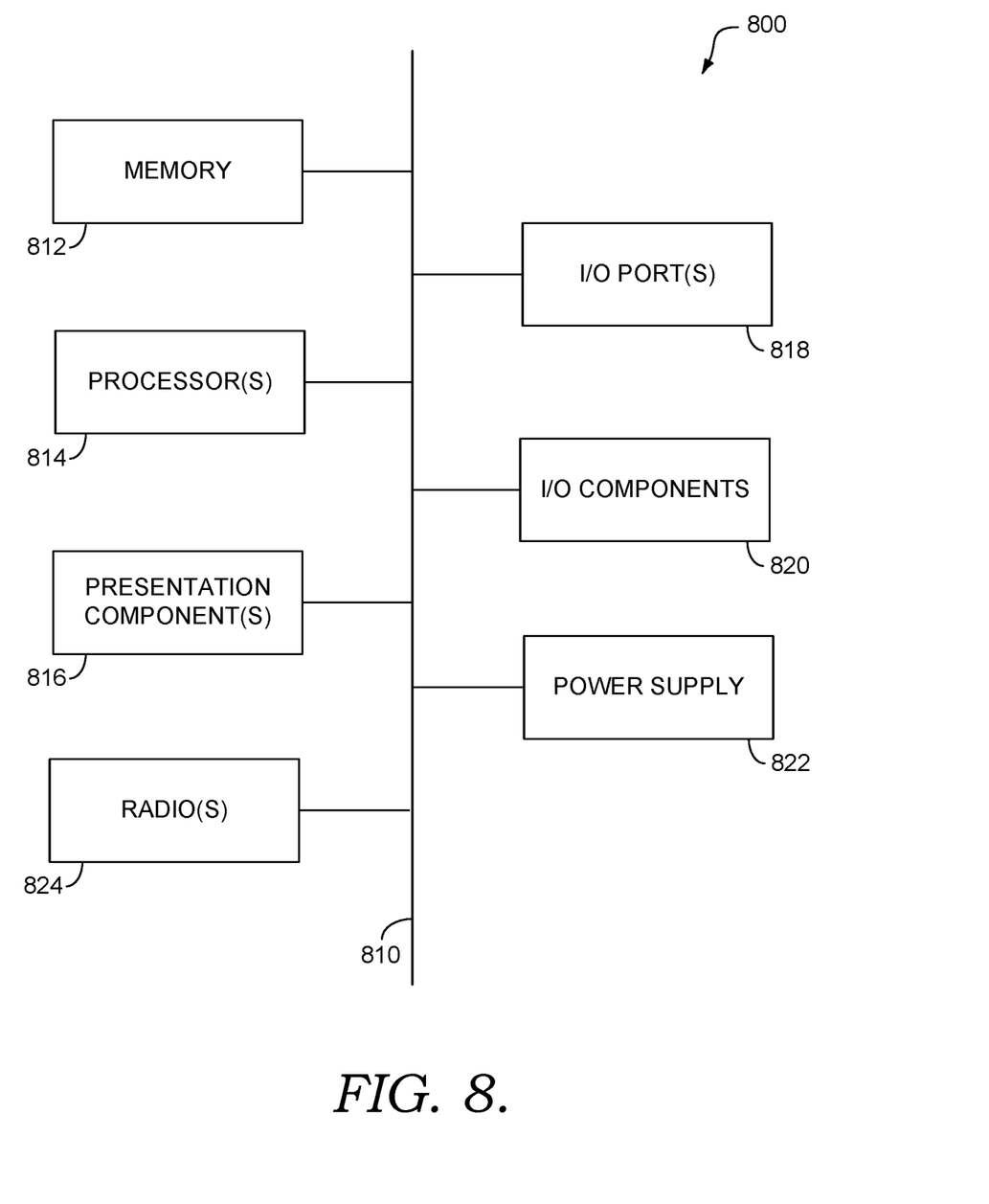
FIG. 8 is a block diagram of an exemplary computing environment suitable for use in implementing an aspect of the present disclosure.

Turning now to FIG. 7 depicts a flow diagram of a method 700 for manipulating a 3D graphical object, in accordance with aspects of the present disclosure. Method 700 could be performed by a computing device, such as computing device 800. The computing device can take the form of a laptop computer, a personal computer with detached display, a tablet computer, a smart phone, a holographic display, a virtual reality headset, an augmented reality headset, or some combination of the above or similar devices.

At step 702, the virtual 3D drawing space comprising the 3D object is output for display. The virtual 3-D drawing space can be displayed in 3-D, using stereoscopic technology, or other techniques that provide a three-dimensional appearance to the display. The virtual 3-D drawing space can also be displayed in 2-D with various camera angles used to depict the 3-D space.

At step 704, a user selection of the 3D object is received. The user selection can occur when the user contacts the 3-D object with a cursor. The cursor can be controlled by a mouse, touchscreen input (e.g., stylus, finger), trackball, gaze detection, head movement, voice control, gestures, or other input techniques. In one aspect, the user selection occurs when the cursor contacts the 3-D object and a second input, such as a mouse click, is provided. As an alternative to a cursor, labeled objects could be selected via voice control, keyboard, or other mechanism.

At step 706, a control around the 3D object is displayed in response to the selection. In one aspect, the control is a two-dimensional control. The control comprises an x-axis control, an y-axis control, and an z-axis control. The control can also include a bounding box that enables uniform and/or non-uniform scaling of the object. In one aspect, the x-axis control is located outside of the bounding box on or adjacent to the x-axis. In one aspect, the y-axis control is located outside of the bounding box on or adjacent to the y-axis. In one aspect the z-axis control is located outside of the bounding box on or adjacent to y or z-axis on the side opposite the x or y-axis control.

At step 708, an input is received through the x-axis control. In an aspect, the input indicates a first direction of rotation from two available directions, for example clockwise or counterclockwise. In another aspect, only a single direction of rotation is associated with the control. If only a single direction is used, the default direction of rotation could be configurable through a user interface. The input could be a tap, press and hold, or some other input. Different amounts of rotation can be achieved in response to the type of input received. For example, the object could start rotating upon the initiation of a press and hold input and stop rotating in response to the hold being discontinued. In one aspect, the rotational velocity increases as the hold continues until a maximum rotational velocity is reached. In another example, a single tap could result in a rotation of a designated amount of degrees, such as 5°, 15°, 20°, 30°, 45°, 60° or 90°. The input could also be sliding the x-axis control as mentioned previously.

At step 710, in response to the input, the object is rotated around the x-axis in the first direction. The rotation can be made visible by a change in the displayed object within the drawing space. In addition, the orientation characteristics of the object within the drawing space are updated. The orientation characteristics can be used to track intersections with other objects within the drawing space.

At step 712, receiving an input through the y-axis control, the input indicating a direction of rotation, for example clockwise or counterclockwise. In contrast to the direction indicated with the x-axis control, the direction selected with reference to the y-axis control is described as a second direction. In an aspect, only a single direction of rotation is associated with the control. If only a single direction of rotation is provided, then the default direction of rotation could be configurable through a user interface. The input could be a tap, press and hold, or some other input. Different amounts of rotation can be achieved in response to the type of input received. For example, the object could start rotating upon the initiation of a press and hold input and stop rotating in response to the hold being discontinued. In one aspect, the rotational velocity increases as the hold continues until a maximum rotational velocity is reached. In another example, a single tap could result in a rotation of a designated amount of degrees, such as 5°, 15°, 20°, 30°, 45°, 60° or 90°. The input could also be sliding the y-axis control as mentioned previously.

At step 714, in response to the input, the object is rotated around the y-axis in the second direction of rotation. The rotation can be made visible by a change in the displayed object within the drawing space. In addition, the orientation characteristics of the object within the drawing space are updated. The orientation characteristics can be used to track intersections with other objects within the drawing space.

At step 716, receiving an input through the z-axis control, the input indicating a direction of rotation, for example clockwise or counterclockwise. In contrast to the directions indicated with the x-axis control and y-axis control, the direction selected with reference to the z-axis control is described as a third direction. In another aspect, only a single direction of rotation is associated with the control. If only a single direction of rotation is provided, then the default direction of rotation could be configurable through a user interface. The input could be a tap, press and hold, or some other input. Different amounts of rotation can be achieved in response to the type of input received. For example, the object could start rotating upon the initiation of a press and hold input and stop rotating in response to the hold being discontinued. In one aspect, the rotational velocity increases as the hold continues until a maximum rotational velocity is reached. In another example, a single tap could result in a rotation of a designated amount of degrees, such as 5°, 15°, 20°, 30°, 45°, 60° or 90°. The input could also be sliding the z-axis control as mentioned previously.

At step 718, in response to the input, the object is rotated around the z-axis in the third direction of rotation. The rotation can be made visible by a change in the displayed object within the drawing space. In addition, the orientation characteristics of the object within the drawing space are updated. The orientation characteristics can be used to track intersections with other objects within the drawing space.

Having described various implementations, an exemplary computing environment suitable for implementing aspects of the disclosure is now described. With reference to FIG. 8, an exemplary computing device is provided and referred to generally as computing device 800. The computing device 800 is but one example of a suitable computing environment and is not intended to suggest any limitation as to the scope of use or functionality of aspects of the disclosure. Neither should the computing device 800 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some aspects of computing device 800 may include one or more radio(s) 824 (or similar wireless communication components). The radio 824 transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of manipulating a three-dimensional (3D) graphical object displayed in a virtual 3D drawing space generated by a computer, the method comprising:
   outputting for display, the virtual 3D drawing space comprising the 3D object;
   receiving a user selection of the 3D object;
   displaying a control having a visible bounding box that surrounds an exterior boundary of the 3D object, the control comprising an x-axis control located on a first exterior side of the visible bounding box, an y-axis control located on a second exterior side of the visible bounding box, and an z-axis control located on a third exterior side of the visible bounding box;
   receiving an input through the z-axis control; and
   in response to the input through the z-axis control, rotating the 3D object around the z-axis.

2. The method of claim 1, wherein the control further comprises a depth control that allows a user to move the 3D object along a z-axis within the 3D drawing space.

3. The method of claim 1, wherein the control further comprises size controls that increase or decrease a size of the 3D object in 3D space.

4. The method of claim 1, wherein the 3D object is selected in response to receiving an indication that a cursor moved over the object.

5. The method of claim 1, wherein the method further comprises:
   receiving an input through the x-axis control; and
   in response to the input through the x-axis control, rotating the 3D object around the x-axis.

6. The method of claim 1, wherein the method further comprises:
   receiving an input through the y-axis control; and
   in response to the input through the y-axis control, rotating the 3D object around the y-axis.

7. The method of claim 1, wherein the first side is to a right side of the 3D object from a viewer's perspective, the second side is above the 3D object, and the third side is below the 3D object.

8. A method of manipulating a three-dimensional (3D) graphical object displayed in a virtual 3D drawing space generated by a computer, the method comprising:
   outputting for display, the virtual 3D drawing space comprising the 3D object;
   receiving a user selection of the 3D object;
   displaying a control having a visible bounding box that surrounds an exterior boundary of the 3D object, the control comprising a first axis control for a first axis located on a first exterior side of the visible bounding box, a second axis control for a second axis located on a second exterior side of the visible bounding box, and a third axis control for a third axis located on a third exterior side of the visible bounding box;
   receiving a first input through the first axis control, the first input indicating a first direction of rotation by selecting a first side of the first axis control;
   in response to the first input, rotating the 3D object around the first axis in the first direction of rotation;
   receiving a second input through the first control, the input indicating a second direction of rotation by selecting a second side of the first control that is opposite the first side; and
   in response to the second input, rotating the 3D object around the first axis in the second direction of rotation.

9. The method of claim 8, wherein the first direction of rotation is clockwise and the first direction of rotation is indicated by selecting a lower portion of the first control.

10. The method of claim 8, wherein the second direction of rotation is counter-clockwise and the second direction of rotation is indicated by selecting an upper portion of the second control.

11. The method of claim 8, further comprising receiving an input through the third axis control, the input indicating a clockwise direction of rotation, by moving the third axis control around a circle oriented perpendicular to the third axis in a clockwise direction.

12. The method of claim 11, wherein a degree of rotation around the third axis corresponds to movement around a circumference of the circle.

13. The method of claim 8, wherein the 3D object is selected in response to receiving an indication that a cursor moved over the 3D object.

14. The method of claim 8, where in the control further comprises a bounding box with size controls in each corner of the bounding box that proportionally increase or proportionally decrease a size of the 3D object in 3D space.

15. The method of claim 8, wherein the first axis control is a x-axis control displayed to a right side of the 3D object from a viewer's perspective, the second axis control is a y-axis control displayed above the 3D object, and the third axis control is a z-axis control displayed below the 3D object.

16. A method of manipulating a three-dimensional (3D) graphical object displayed in a virtual 3D drawing space generated by a computer, the method comprising:
   outputting for display, the virtual 3D drawing space comprising the 3D object;
   receiving a user selection of the 3D object;
   displaying a control around the 3D object, the control comprising an x-axis control, an y-axis control, an z-axis control, and a bounding box that surrounds an exterior boundary of the 3D object, wherein the x-axis control, an y-axis control, an z-axis control are located on different exterior sides of the bounding box;

receiving an input through the z-axis control, the input indicating a direction of rotation; and in response to the input, rotating the 3D object around the z-axis in the direction of rotation.

17. The method of claim 16, wherein the direction is clockwise and the direction is indicated by moving the z-axis control around a circle having oriented perpendicular to the z-axis.

18. The method of claim 17, wherein a degree of rotation around the z-axis corresponds to movement around a circumference of the circle.

19. The method of claim 16, wherein the direction of rotation is clockwise and the direction of rotation is indicated by dragging the z-axis control to the right from a viewer's perspective.

20. The method of claim 16, wherein the x-axis control is displayed to a right side of the 3D object from a viewer's perspective, the y-axis control is displayed above the 3D object, and the z-axis control is displayed below the 3D object.

\* \* \* \* \*